April 17, 1962 E. J. MADERA 3,030,122
RIG FOR ICE FISHING
Filed June 22, 1960 2 Sheets-Sheet 1
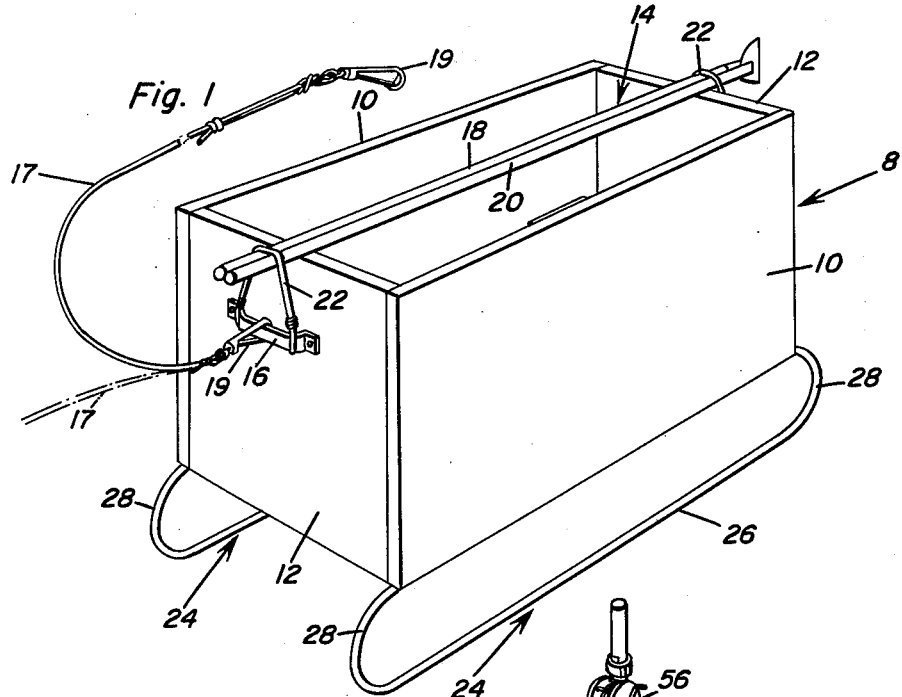
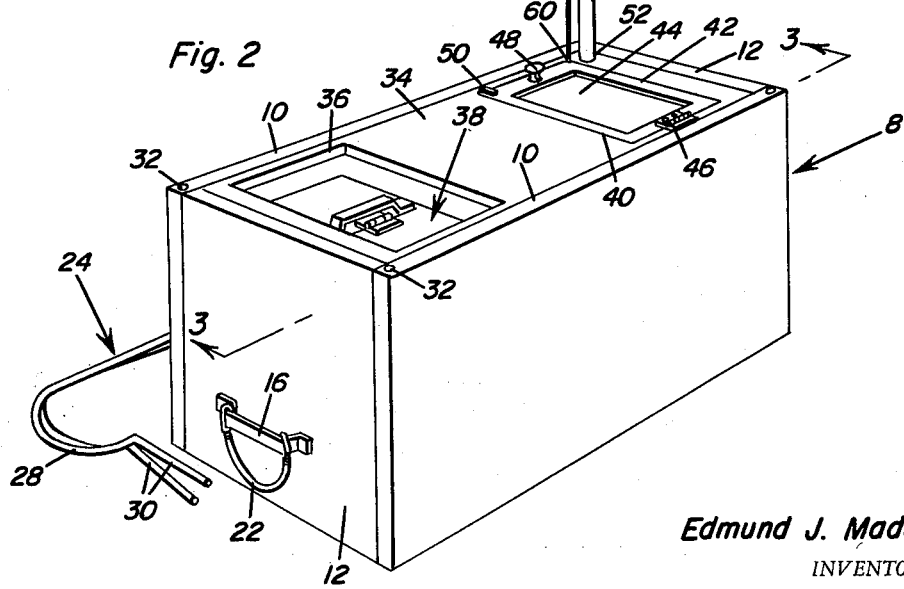
Edmund J. Madera
INVENTOR.

April 17, 1962 E. J. MADERA 3,030,122
RIG FOR ICE FISHING
Filed June 22, 1960 2 Sheets-Sheet 2
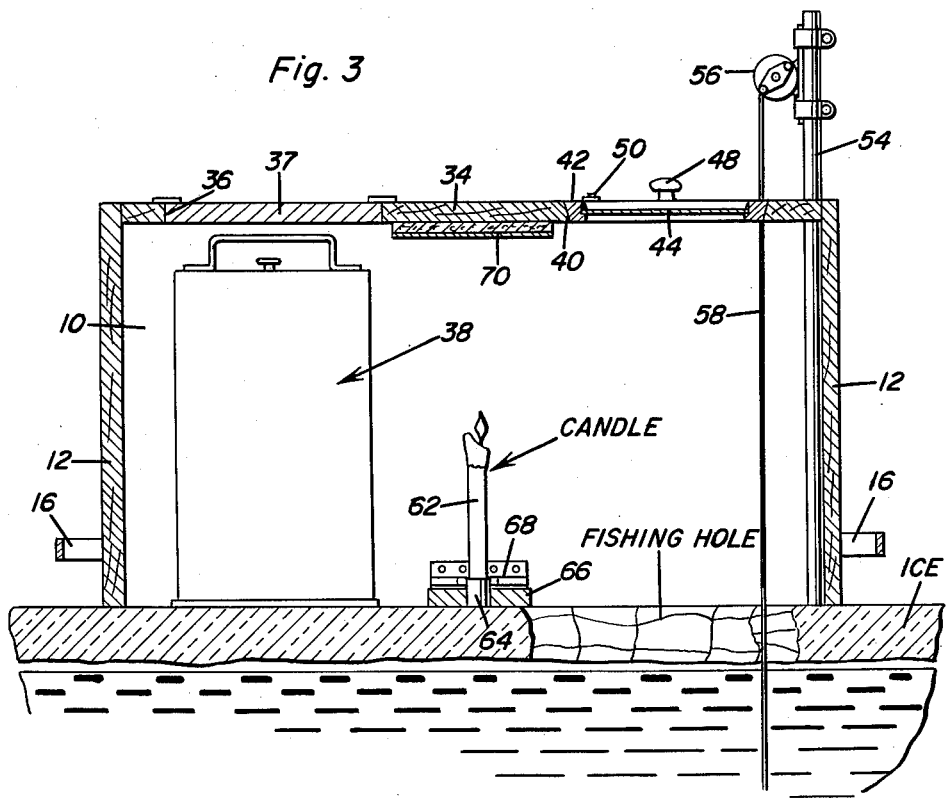
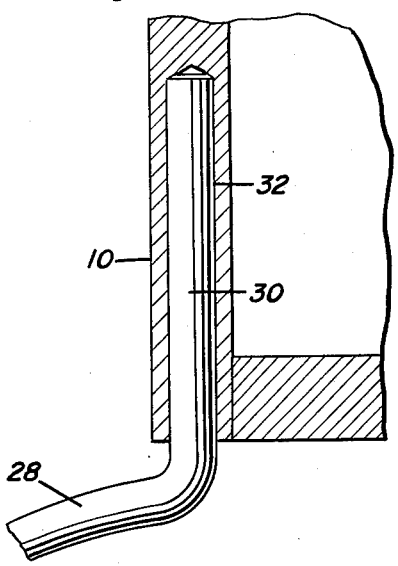
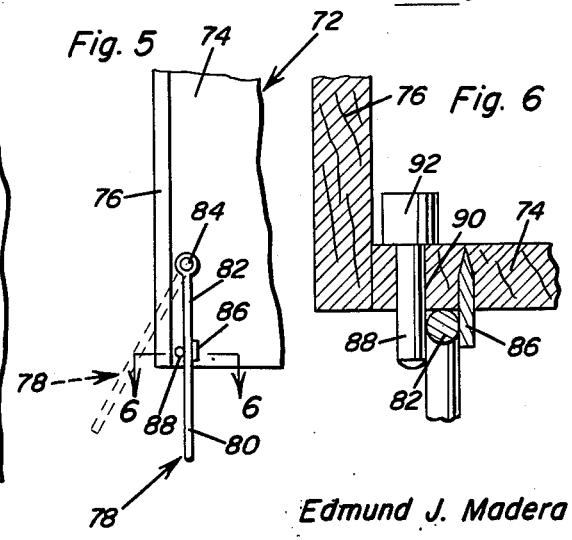
Edmund J. Madera
INVENTOR.

United States Patent Office 3,030,122
Patented Apr. 17, 1962

3,030,122
RIG FOR ICE FISHING
Edmund J. Madera, 17617 Russell, Detroit, Mich.
Filed June 22, 1960, Ser. No. 38,333
8 Claims. (Cl. 280—12)

This invention relates to certain new and useful improvements in an ice fishing rig which is such in construction that it enables a user thereof to conveniently carry and transport equipment and tackle to a desired fishing spot, then converts to a fishing hole housing or shield, prevents the fishing hole from freezing over or being closed by snow on a snowy or windy day, or night, as the case may be.

Ice fishing involves many problems. Therefore, an object of the instant invention is to provide a simple practical and inexpensive portable multipurpose rig which embodies the necessary facilities to cope with and solve many of the problems, keeping in mind the varying day and night conditions involved. To these ends, a preferred embodiment of the invention is that herein shown and hereinafter described.

One achievement has to do with a portable container and carrier for tackle and gear. A simple wooden or an equivalent box has been found to be suitable for currently recognized needs. While handling the box on land suitable hand-grips or handles are used and are located on end walls of the box. These handles enable the user to pick up and carry the loaded box in an obvious manner. Also, by attaching strong rubber bands or the like to the handles, implements, such as rods and an ice hole chipper may be placed lengthwise across the open top of the box and held in place by the bands. These same handles may be used to permit the fisherman to attach a shoulder strap or sling thereto whereby to allow the box to be suspended from the shoulders and thus carried over a long distance.

Another featured improvement relates to the adoption and use of sled runners. These runners may be either hingedly or removably mounted on the bottom of the box or container so that the rig may be used as a sled and pulled or hauled over the ice to the desired fishing spot.

When the fishing spot is reached the box or container converts to a fishing hole housing or shield. To accomplish this the box is turned over or upside-down whereupon the open top becomes the bottom. A hole is chipped in the ice and the housing is set on the ice over the hole and constitutes a weather shield. A source of light and heat is provided in the housing space or compartment with the result that the hole and baited line in the hole are visible. The heat which accumulates in the space keeps the hole from freezing over and the heated space in the housing may be resorted to for warming the fisherman's hands from time to time. Experience has shown that a simple candle provides ample heat and light. When fish are not biting at the selected place, the rig or housing may be readily shifted to another place.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of the improved ice fishing rig illustrating the manner in which it is employed as a sled.

FIG. 2 is also a view in perspective showing the rig turned upside-down and converted to serve as a cover and weather shield for the fishing hole, in the manner illustrated in FIG. 3.

FIG. 3 is a view with parts in section and elevation taken on the section line 3—3 of FIG. 2.

FIG. 4 is an enlarged fragmentary detail view showing one corner of the box-type container suitably constructed to removably mount the cooperating end portion of a sled runner.

FIG. 5 is a view on a smaller scale in elevation showing a modified runner and how it is constructed, mounted and used.

FIG. 6 is an enlarged view in section and elevation taken on the plane of the line 6—6 of FIG. 5.

Reference will be had first to FIGS. 1 to 3, inclusive. In FIG. 1 the rig is shown as a sled. In early winter a car cannot be safely driven on the ice of the lake, and an equipment container and transporting sled, such as that shown, is needed. The container comprises a wooden or an equivalent box 8. There is no restriction on the size of the box but experience has shown that it may be approximately two feet long, sixteen inches wide and about fourteen inches high. This container or box constitutes a weather shield or housing as will be evident from FIG. 2. The longitudinal side walls 10 are joined by suitable connected transverse end walls 12. The top or upper side of the box is here shown as open as at 14 (FIG. 1). Inasmuch as the box is converted to a fishing hole housing (FIGS. 2 and 3) it may be explained that the terms "top" and "bottom" are used advisedly.

Suitable handles or hand-grips 16 are attached to upper portions of the end walls and in practice a pull rope 17 having snap fasteners 19 at the ends may be attached to these handles. This same pull rope may be employed as a shoulder strap or sling when the user desires to carry the container for a relatively long distance over land. Ice hole chipping implements are denoted at 18 and 20 and these are positioned lengthwise atop the box or container 8 and there held removably in position by elastic loops or bands 22 carried by the handles 16. The sled runners are designated at 24 and may be fashioned from rod stock having straight portions 26 and curved end portions 28. The end portions as shown in FIG. 2 have upstanding terminals 30 which may be described as attaching and retaining shanks. With reference to FIG. 4 it will be seen that each corner portion of the box or container is provided with a vertical socket 32 into which the cooperating shank 30 is removably fitted. With this construction the runners may be applied and removed at will.

As is evident by comparing FIG. 2 with FIG. 1, when the fishing hole has been reached and the user no longer needs the sled, the runners may be removed and laid aside. Whereas the box or container 8 is in its normal or upright position to handle and carry fishing equipment it is obvious that when inverted, after the ice hole has been chipped through the ice the open top 14 becomes the bottom and the then existing lower edges of the walls rest atop the ice, enclosing the fishing hole in the manner illustrated in FIG. 3. The inversion thus made also causes the bottom (FIG. 1) to become the top wall 34 in FIG. 2. At the left hand end a rectangular or an equivalent opening is provided at 36 and a suitable heat retaining cover 37 is provided. Obviously, this covered opening is such that it serves to accommodate an insertable and removable bait container or bucket 38. As shown in FIG. 3 the bucket rests atop the ice and the closure means at the top is rendered accessible by way of the opening 36. A second opening 40 is provided at the right hand end of the top in FIGS. 2 and 3 and this opening serves to accommodate a normally closed cover. More specifically, this cover comprises a frame 42 provided with a suitable thermopane window 44. The cover is suitably hinged at one end as at 46, is provided at the other end with a knob 48 and an appropriate latch 50 is provided at this end to keep the cover closed. In the upper right hand corner in FIG. 2 a hole is provided as at 52 to accommodate the insertable and removable portion 54 of a fishing rod or pole. This rod is provided with a suitable reel 56 which is accessible and carries the fishing line 58, the line extending downwardly into the compartment or space of the housing by way of a suitable hole 60.

The source of heat and light comprises a common candle 62 fitted into a socket or cup 64 carried by a wooden or an equivalent relatively narrow cross-piece or member 66. This member spans the space between the side walls and has one end hinged as at 68 so that when it is not being used it may be folded to an out-of-the-way position (not detailed). This cross member is preferably on a plane with the lower edges of the walls of the housing when it is being used. If desired, a metal flame guard or plate 70 is provided above the candle flame.

With reference now to the modified runner construction seen in FIGS. 5 and 6 the container or box is denoted at 72, one end wall at 74 and a side wall at 76. The runner is denoted at 78 and is provided with curved end portions 80 having upstanding shanks 82 hingedly or pivotally mounted in place as at 84. As better shown in FIG. 6 the numeral 86 designates an outstanding stop or shoulder against which the cooperating shank is held by a retaining peg or pin. This pin 88 extends slidably through a passage or hole 90 provided therefor and projects in parallelism with the shoulder 86 in a manner to clamp the shank 82 in the manner shown. On the inner end of the pin or peg a suitable head or finger-grip 92 is provided.

During most of the winter there are few times when it is warm enough to fish without running the risk that the fishing hole will freeze up. This condition makes it necessary to thaw out the line and to continue dipping out the ice. With this hole enclosing shield or housing in place as seen in FIGS. 2 and 3 these difficulties are obviously overcome. The candle supporting cross-piece 66 is hinged so that it is flush with the bottom of the rig so that the rig sits flat on the ice. As is obvious the thermopane window affords a clear view into the space or compartment of the housing and the lighted candle therein keeps the water in the hole from freezing. In addition, with the minnows or bait kept in the container or bucket the heat from the candle also keeps the minnow water from freezing. The flame of the candle enables the fisherman to fish as long as desired, that is, until the candle has been used up. On windy days the housing keeps the hole from filling with snow. Being light in weight it may be easily moved from one spot to another. The hinged window-equipped cover permits access to be had to the housing compartment or space for handling the fishing line 58.

To mount the sled runners the housing or box is in the position seen in FIG. 2. As already mentioned, when the box is right-side-up as seen in FIG. 1 to function as a sled container, the hinged cross-piece 66, after the candle has been removed, may be folded to an out-of-the-way position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use when ice fishing, a housing embodying side and end walls, a top wall, and an open bottom, the bottom of said housing being adapted to rest atop the ice in line with and thus cover a hole in the ice, a cross-piece having one end hingedly mounted on one side wall and extending across the space between the two side walls, said cross-piece having a socket member for reception and retention of a conventional candle, said top wall having an opening to accommodate a bait bucket, said bait bucket being insertable and removable by way of said opening, said top wall also having another opening, and a hinged cover for the latter opening, said cover embodying a window.

2. The combination of claim 1, and sled runners mounted on a side of said housing, said housing comprising a box the receptacle portion of which is suitable for storing and carrying fishing equipment.

3. The combination of claim 1, and sled runners mounted on a side of said housing, said housing comprising a box having a receptacle portion suitable for storing and carrying fishing equipment, handles provided on end walls of said box, said handles serving the usual purpose of handling and carrying the box and also being adapted, if so desired to permit the user to fasten a shoulder strap thereto in case the user desires to carry the load on his suitable shoulders.

4. For use either day or night; an ice fishing rig comprising a box embodying rigid interconnected side, end and top walls and providing a portable housing, said box being open on one side and adapted to rest with the open side down atop the ice, said end, side and top walls encompassing and enclosing a fishing hole in the ice, said walls being spaced an appreciable distance from the hole, the walled space of said housing providing an enclosure for a bait bucket, one corner of the top wall of said housing also having a restricted hole therein to permit passage of and retain an insertable and removable fishing rod in an upstanding read-to-use position, the top wall of the housing also having at least one relatively large opening affording free access to the space of the housing in line with said fishing hole, a removable cover for said opening, means provided wholly within the median area of the space in said housing for supporting a source of heat capable of heating the space of the housing in a manner to keep the fishing hole from freezing over while the user is fishing, said means being hingedly mounted between the bottom edge portions of the side walls and being flush therewith when being used.

5. The structure according to claim 4, and wherein said means comprises a crosspiece spaced from the respective end walls, said crosspiece having one end hingedly connected with an adjacent one of said side walls, the other end being free of connection with the other side wall, said crosspiece being of a length less than the height of said side walls and, when not in use, being swingable upwardly and against said one side wall to assume an out-of-the-way position.

6. An ice fishing rig comprising an invertable container having an open upper side and adapted to carry fishing tackle and miscellaneous equipment, said container having end walls provided with accessible carrying handles, said handles being provided with elastic loops, said loops being positioned adjacent the level of said upper open side in a manner to yieldingly embrace and hold tools and rods atop said open side, said container having a bottom side, a pair of spaced parallel readily applicable and removable runners having upstanding end portions mounted on end portions of said container, said bottom having at least one opening and a readily applicable and removable closure for said opening.

7. The structure defined in claim 6 and wherein the upstanding end members terminate in attaching and retaining shanks, said shanks fitting telescopically and removably into sockets provided therefor in cooperating intended corner portions of said bottom side.

8. The structure defined in claim 6 and wherein the upstanding end portions are pivotally mounted on end walls of the container, and retaining means mounted on said end walls serving to retain the runners in upright position when in use and permitting said runners to be swung to an out-of-the-way position when they are not being used.

(References on following page)

References Cited in the file of this patent

UNITED STATES PATENTS

| | | |
|---|---|---|
| 1,026,059 | Smith | May 14, 1912 |
| 1,253,746 | Teeling | Jan. 15, 1918 |
| 2,301,089 | Stevens | Nov. 3, 1942 |
| 2,546,588 | Ellis | Mar. 27, 1951 |
| 2,555,073 | Zdankoski | May 29, 1951 |
| 2,618,091 | Sheraski | Nov. 18, 1952 |
| 2,681,809 | Hamill | June 22, 1954 |
| 2,883,784 | Obernolte | Apr. 28, 1959 |

FOREIGN PATENTS

| | | |
|---|---|---|
| 417,013 | France | Aug. 20, 1910 |